(12) United States Patent
Vas'Ko et al.

(10) Patent No.: US 7,688,545 B1
(45) Date of Patent: Mar. 30, 2010

(54) RECORDING HEAD WRITER WITH HIGH MAGNETIC MOMENT MATERIAL AT THE WRITER GAP AND ASSOCIATED PROCESS

(75) Inventors: Vladyslav A. Vas'Ko, Apple Valley, MN (US); Frank E. Stageberg, Edina, MN (US); Feng Wang, Lakeville, MN (US); Vee S. Kong, Richfield, MN (US); Daniel J. Dummer, St. Anthony, MN (US); Martin L. Plumer, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 703 days.

(21) Appl. No.: 10/390,447

(22) Filed: Mar. 17, 2003

Related U.S. Application Data (60) Provisional application No. 60/409,917, filed on Sep. 11, 2002.

(51) Int. Cl.
*G11B 5/31* (2006.01)
(52) U.S. Cl. .................... 360/125.45; 360/125.42; 360/125.63
(58) Field of Classification Search ............... 360/126, 360/317, 125.41, 125.43, 125.44, 125.45, 360/125.5, 125.54, 125.56, 125.57, 125.58, 360/125.63
See application file for complete search history.

(56) References Cited

U.S. PATENT DOCUMENTS

| 4,618,542 | A | * | 10/1986 | Morita et al. ............. 428/836.2 |
|---|---|---|---|---|
| 5,057,380 | A | * | 10/1991 | Hayashi et al. ............. 428/829 |
| 5,057,958 | A | * | 10/1991 | Chabrolle ................... 360/125 |
| 5,132,859 | A | * | 7/1992 | Andricacos et al. ......... 360/126 |
| 5,140,486 | A | * | 8/1992 | Yokoyama et al. .......... 360/125 |
| 5,290,629 | A | * | 3/1994 | Kobayashi et al. .......... 428/812 |
| 5,606,478 | A | | 2/1997 | Chen et al. .................. 360/126 |
| 5,831,801 | A | * | 11/1998 | Shouji et al. ................ 360/126 |
| 5,843,521 | A | | 12/1998 | Ju et al. ...................... 427/129 |
| 5,864,450 | A | | 1/1999 | Chen et al. .................. 360/113 |
| 5,966,800 | A | | 10/1999 | Huai et al. ................ 29/603.13 |
| 6,034,847 | A | | 3/2000 | Komuro et al. ............. 360/126 |
| 6,118,629 | A | | 9/2000 | Huai et al. | |
| 6,132,892 | A | * | 10/2000 | Yoshikawa et al. .......... 428/812 |

(Continued)

FOREIGN PATENT DOCUMENTS

JP     05275234 A  * 10/1993

(Continued)

OTHER PUBLICATIONS

Winnie Yu and Dr. James Bain; Abstract of the Optimization of Sputtered High Moment FeCo For Magnetic Recording Heads; p. 2 of 2002 Individual Research Efforts With Abstracts from A National Science Foundation Engineering Research Center at Carnegie Mellon University, Apr. 2002.

*Primary Examiner*—Craig A. Renner
(74) *Attorney, Agent, or Firm*—Kinney & Lange, P.A.

(57) ABSTRACT

A magnetic recording head with an overall planar design and tight dimensional control of throat height and notch width is achieved below the gap. Writer poles include very high magnetic moment material on both sides of the writer gap. Additionally the pole tips are shaped to provide high field with good spatial gradient for optimal writing conditions, thereby extending the capability of longitudinal recording heads for high density and high frequency applications.

19 Claims, 8 Drawing Sheets

U.S. PATENT DOCUMENTS

| | | | |
|---|---|---|---|
| 6,190,764 B1 | 2/2001 | Shi et al. | 428/332 |
| 6,259,583 B1* | 7/2001 | Fontana et al. | 360/126 |
| 6,342,311 B1 | 1/2002 | Inturi et al. | 428/692 |
| 6,417,990 B1 | 7/2002 | Zhou et al. | 360/126 |
| 6,507,457 B2 | 1/2003 | He et al. | |
| 6,562,487 B1 | 5/2003 | Vas'ko et al. | |
| 6,621,659 B1* | 9/2003 | Shukh et al. | 360/126 |
| 6,687,082 B1* | 2/2004 | Ishiwata et al. | 360/126 |
| 6,724,572 B1* | 4/2004 | Stoev et al. | 360/126 |
| 6,791,795 B2* | 9/2004 | Ohtomo et al. | 360/126 |
| 6,795,272 B2* | 9/2004 | Kudo et al. | 360/126 |
| 6,801,393 B2* | 10/2004 | Oki et al. | 360/126 |
| 6,822,830 B2 | 11/2004 | Mino et al. | |
| 6,912,106 B1* | 6/2005 | Chen et al. | 360/126 |
| 2002/0024776 A1* | 2/2002 | Sasaki et al. | 360/317 |
| 2002/0145824 A1 | 10/2002 | Tabakovic et al. | 360/126 |
| 2003/0021064 A1* | 1/2003 | Ohtomo et al. | 360/126 |
| 2003/0179497 A1* | 9/2003 | Harris et al. | 360/126 |
| 2004/0090703 A1* | 5/2004 | Morita et al. | 360/126 |
| 2004/0169959 A1* | 9/2004 | Kudo et al. | 360/126 |

FOREIGN PATENT DOCUMENTS

| | | |
|---|---|---|
| JP | 8147625 | 6/1996 |

* cited by examiner

RECORDING HEAD WRITER WITH HIGH MAGNETIC MOMENT MATERIAL AT THE WRITER GAP AND ASSOCIATED PROCESS

CROSS-REFERENCE TO RELATED APPLICATION(S)

This application claims priority from U.S. Provisional Application No. 60/409,917, filed on Sep. 11, 2002 for Recording Head Writer With High Magnetic Moment Material At The Writer Gap And Associated Process of Vladyslav Alexandrovich Vas'ko, Frank Edgar Stageberg, Feng Wang, Vee Sochivy Kong, Daniel Joseph Dummer, and Martin Louis Plumer, which application is hereby incorporated by reference in its entirety.

BACKGROUND OF THE INVENTION

The present invention relates generally to the storage and retrieval of data within magnetic media. In particular, the present invention relates to the placement of high magnetic moment material at the writer pole tip, a novel writer head design incorporating high magnetic moment material of the pole tip, and the process for manufacturing the novel writer head.

A typical magnetic head consists of two portions: a writer portion for storing magnetically encoded information on a magnetic media, for example a disc, and a reader portion for retrieving the magnetically encoded information from the disc. The reader portion typically consists of two shields with a magnetoresistive (MR) sensor positioned between the shields. Magnetic flux from the surface of the disc causes rotation of the magnetization vector of a sensing layer of the MR sensor, which in turn causes a change in electrical resistivity of the MR sensor. This change in resistivity of the MR sensor can be detected by passing a current through the MR sensor and measuring the voltage across the MR sensor. External circuitry then converts the voltage information into an appropriate format and manipulates that information as necessary.

The disc or other magnetic media is typically organized into tracks which are further organized into bit fields. The MR sensor is held in close proximity to the surface of the disc so that the sensor can be affected by the magnetic flux from each bit field within the disc. As the MR sensor travels along a track of the disc, any change in directionality of the magnetic flux between bit fields is detected by the MR sensor. The rotation of the magnetization vector with the change from one bit field to another results in the corresponding resistivity change and consequent voltage output from the MR sensor. Since it is the change from one bit field to another that is detected and results in the data output, it is critical that those transitions be sharp, that is, as narrow as possible. In other words, the domain wall between bit fields with opposite magnetization vectors will be as small in area as possible. Sharp transitions, as well as other characteristics for successful reading, are not controlled by the reader, but instead by the writer and the process used to encode the data within the magnetic media.

The writer typically consists of two magnetic poles separated from each other at an air bearing surface of the write head by a write gap. Additionally, the two magnetic poles are connected to each other at a region away from the air bearing surface by a back via. The magnetic flux path created by the two magnetic poles and back via is commonly called the magnetic core. Positioned between the two poles are one or more layers of conductive coils encapsulated by electrically insulating layers. To write data to the magnetic media, a time varying electrical current, or write current is caused to flow through the conductive coils. The write current produces a time varying magnetic field in the magnetic poles and across the write gap. A magnetic media is passed over the air bearing surface of the writer at a predetermined distance such that the magnetic surface of the media passes through the gap field. As the write current changes, the write gap field changes in intensity and direction.

The magnetic fringe field created by the writer gap causes and controls the write process. The cross sectional area of this writer gap is critical and determines the magnetic field strength. The cross-sectional area of the writer gap is defined by two parameters, the throat height and notch width. A very short throat height decreases the gap area and effectively increases the fringe field. A larger field allows the writer to activate the higher coercivity media that is necessary for high linear density recording. Control of the throat height is important for magnetic field control. Excessively short throat height can cause excessive magnetic flux density in the gap and create fringe field distortion. Dimensional control of the notch width is also important for reasons similar to those described for throat height control.

Recent years have seen a considerable increase in data storage densities. Generally, the storage capacity of a magnetic data storage and retrieval device is increased through use of magnetic media having an increased areal density. Areal density is the number of units of data stored in a unit area of the media. Areal density is determined by two components of the magnetic media: the track density (the number of data tracks per unit width of the magnetic media) and the linear density (the number of units of data stored per unit of length of the data track). To increase the areal density of a magnetic media one must increase the linear density and/or the track density of the magnetic media.

Increases in areal density have been achieved by: increasing the strength of the write gap field, decreasing the thickness of the gap between the magnetic poles at the air bearing surface, decreasing the width of the writer poles at the air bearing surface and increasing the coercivity of the magnetic media. These improvements require the material(s) of the magnetic core to conduct relatively high flux densities. Magnetic softness and well-defined anisotropy are properties of materials related to the ability to readily conduct magnetic flux.

Materials have a magnetic saturation level beyond which they will conduct no additional flux. Therefore each material has an intrinsic limit to the flux density that can be conducted. Consequently, it is desirable to incorporate high magnetic moment (HMM) materials because these materials can conduct a larger quantity of flux before reaching the point of magnetic saturation. The ability to conduct relatively high flux densities is especially desirable at those portions of the magnetic core or poles which are adjacent to the gap. Those portions, commonly called the pole tips, are critical for controlled and effective direction of the magnetic flux into the media.

In addition to the ability to conduct high flux densities, writer poles also need to avoid the formation of eddy currents. Eddy currents are induced through the magnetic core each time the write gap field changes directions. These eddy currents, which are counteracting to the flow of current from the change in direction of the write gap field, have a negative effect on the performance of the transducing head. First, the eddy currents act as a shield to prevent external fields from penetrating the magnetic core, thereby reducing the efficiency of the transducing head. Second, the increased eddy currents increase the time required to reverse the direction of magnetic flux through the magnetic core, thereby negatively impacting the data rate of the writer. Typically, eddy current effects can be minimized by increasing the resistivity of the material forming the magnetic core. Higher resistivity materials, however, generally have lower saturation moments and the high magnetic moment materials commonly have low resistivity.

Since it is difficult to find a material having the combined properties of a high magnetic moment, high permeability/low coercivity and a high resistivity, more recent prior art writers have used multiple materials to lend the combination of these properties to the writer. Frequently, prior art designs would focus on improving a single aspect of writer performance, for example reducing eddy currents. One such prior art approach is to form the magnetic core of two layers. One layer is formed of a high magnetic moment material and the other layer is formed of a material with a greater resistivity. But, the use of a multi-layer core will necessarily reduce the overall magnetic moment over that possible with a writer formed of solely high magnetic moment material.

A second prior art approach is to form a top pole of the magnetic core of two pieces: one piece of a high magnetic moment material and a second piece of a high resistivity material. This "two piece pole" (TPP) design originated from the need to build the pole tip separately from the pole yoke due to photo-processing concerns. Additionally, a bottom (or shared) pole of the magnetic core may be a recessed pole similarly formed of two pieces. In the case in which both the top and bottom pole are formed of two pieces, the build process of the writer would progress as follows: A planar second bottom pole piece would be deposited; a planar first bottom pole piece would be deposited on a portion of the second bottom pole piece; a write gap layer would be deposited over an exposed portion of the second bottom pole piece and the first bottom pole piece, a planar first top pole piece would be deposited over the write gap layer; a tri-layer stack formed of the first bottom pole piece, the write gap layer, and the first top pole piece would be shaped to define a pole tip region; insulating layers and coils would be deposited; and finally, a second top pole piece would be deposited over the first top pole piece, as well as over the insulating layers and coils. This build process is necessary because the first bottom pole piece and the second bottom pole piece need to be built on a flat surface to allow for proper shaping of the pole tips. Thus, the existing TPP structures all require stacking the first pole piece on the second pole piece, which is inefficient for flux transportation in addition to increasing the cost and complexity of the manufacturing process.

Accordingly, there is need for a high efficiency writer incorporating very high magnetic moment materials for use with high density magnetic data storage media.

BRIEF SUMMARY OF THE INVENTION

A magnetic transducing head including a magnetic write element with an overall planar design, including a substantially planar top pole and writer poles including very high magnetic moment material on both sides of the writer gap. The very high magnetic moment materials are additionally coupled to softer magnetic materials with medium to high magnetic moments. Additionally, tight dimensional control of throat height and notch width is achieved below the gap with shaping to provide high field with good spatial gradient for optimal writing conditions, thereby extending the capability of longitudinal recording heads for high density and high frequency applications.

DETAILED DESCRIPTION

Figure 1:
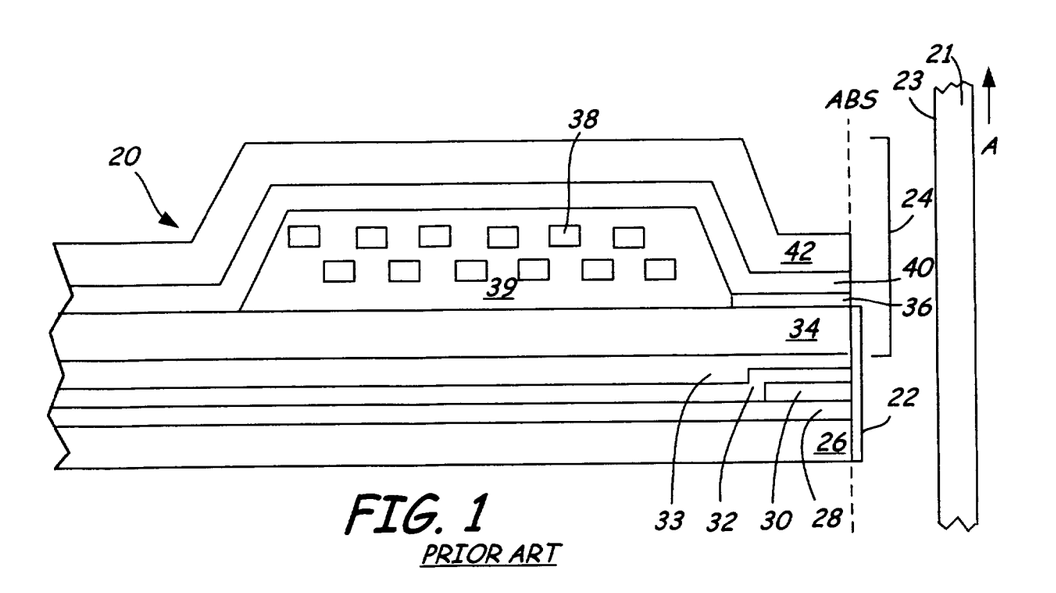
FIG. 1 is a cross-sectional view of a prior art transducing head taken along a plane normal to the air bearing surface of the transducing head.
Figure 2:
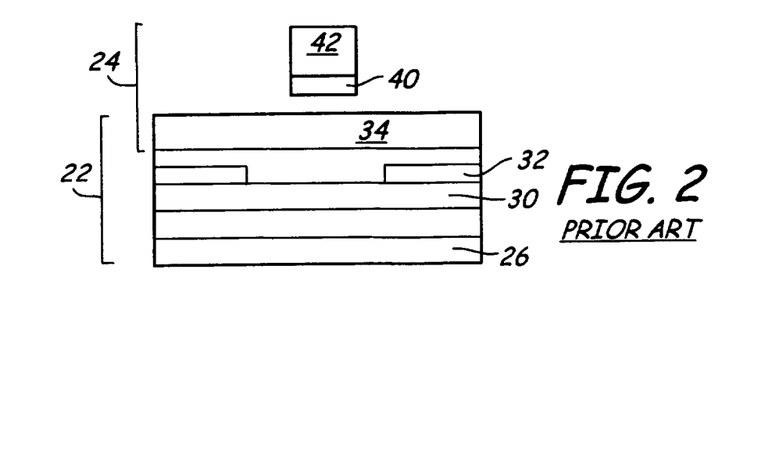
FIG. 2 is a layered diagram that illustrates the location of a plurality of magnetically significant elements of the transducing head of FIG. 1 as they appear along the ABS of the transducing head.

FIG. 1 is a cross-sectional view of prior art transducing head 20 taken along a plane normal to air bearing surface (ABS) of transducing head 20. The ABS of transducing head 20 faces disc surface 23 of magnetic disc 21. Magnetic disc 21 travels or rotates in a direction relative to transducing head 20 as indicated by arrow A. Spacing between the ABS of the transducing head 20 and disc surface 23 is preferably minimized while avoiding contact between transducing head 20 and magnetic disc 21. Transducing head 20 includes reader portion 22 and writer portion 24. FIG. 2 is a layered diagram that illustrates the location of a plurality of magnetically significant elements of transducing head 20 as they appear along the ABS of the transducing head. For clarity, the spacing and insulating layers have been omitted.

Reader portion 22 of transducing head 20 includes bottom shield 26, first gap layer 28, magnetoresistive (MR) read element 30, second gap layer 33, contact layer 32, and shared pole 34. A read gap is defined on the ABS between terminating ends of bottom shield 26 and shared pole 34. MR read element 30 is positioned between terminating ends of first gap layer 28 and second gap layer 33. First and second gap layers 28 and 33 are positioned between bottom shield 26 and shared pole 34. Bottom shield 26 and shared pole 34 may be layered upon separate seed layers (not shown). The seed layers are selected to promote the desired magnetic properties of respective bottom shield 26 and shared pole 34.

Writer portion 24 of transducing head 20 includes shared pole 34, write gap layer 36, conductive coils 38, insulator layer 39, top pole seed layer 40 and top pole 42. A write gap is defined at the ABS by write gap layer 36 between terminating ends of shared pole 34 and top pole 42. Conductive coils 38 are positioned in insulator layer 39 between shared pole 34 and top pole 42, such that the flow of electrical current through conductive coils 38 generates a magnetic field across the write gap.

The performance of writer portion 24 of transducing head 20 is strongly tied to the magnetic characteristics of top pole 42 and shared pole 34, which in turn are a function of the materials and processes used in the construction of top pole 42 and shared pole 34. In particular, the prior art taught that the top pole 42 and shared pole 34 each have soft magnetic properties, such as a high permeability to increase the efficiency of writer 24, a high saturation magnetization to increase the strength of the write gap field, a high corrosion resistance to increase the life of writer 24, and a high resistivity to minimize eddy currents in shared and top poles 34 and 42.

In prior art transducing heads, top pole 42 and shared pole 34 are commonly formed of materials such as Permalloy ($Ni_{81}Fe_{19}$), which has a relative permeability of approximately 2500 at 10 MHz and a saturation magnetization of approximately 1 Tesla; Sendust (FeSiAl), which has a permeability of approximately 1000 at 10 MHz and a saturation magnetization of approximately 1.1 Tesla; or $Ni_{45}Fe_{55}$, which has a permeability of approximately 1500 at 10 MHz and a saturation magnetization of approximately 1.6 Tesla. Although these materials proved useful in prior art transducing heads, recent demand for increased data storage densities require magnetic poles in writers to have a saturation magnetization in excess of those achieved in poles formed of purely Permalloy or Sendust. Prior attempts of using higher magnetic moment materials in forming the poles to increase the saturation magnetization of the writer poles have negatively impacted several of the other necessary properties of the writer, such as decreasing the permeability and/or the corrosion resistance of the poles, or resulting in less robust manufacturing processes necessary to build the transducing head.

Figure 3:
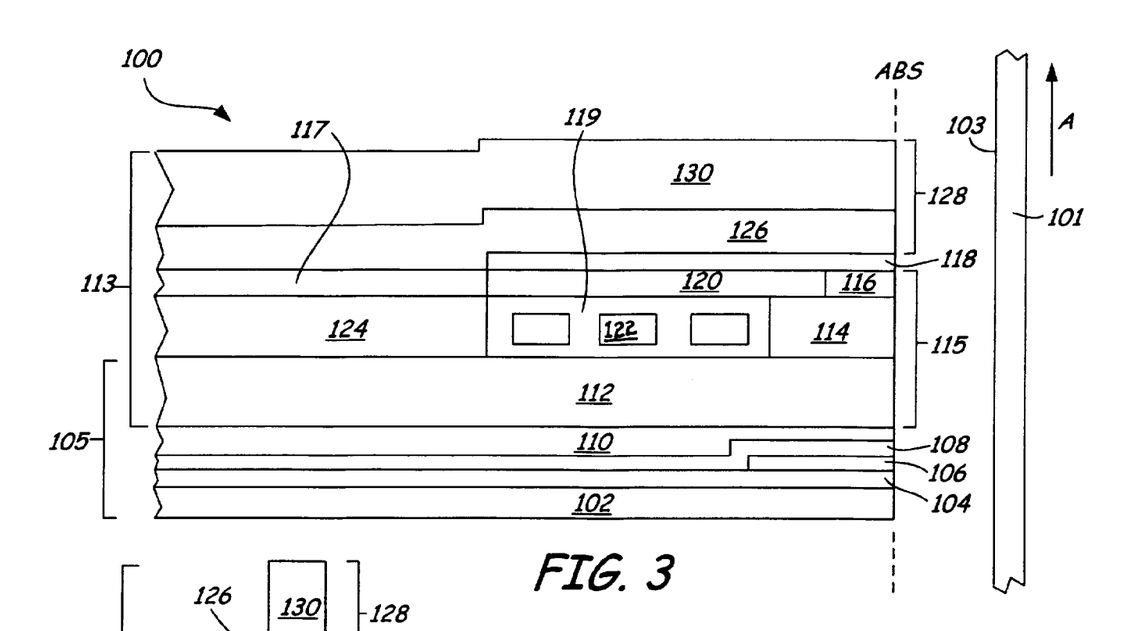
FIG. 3 is a cross-sectional view of a transducing head in accord with the present invention, the cross-sectional view being taken along a plane parallel to the air bearing surface of the transducing head.
Figure 4:
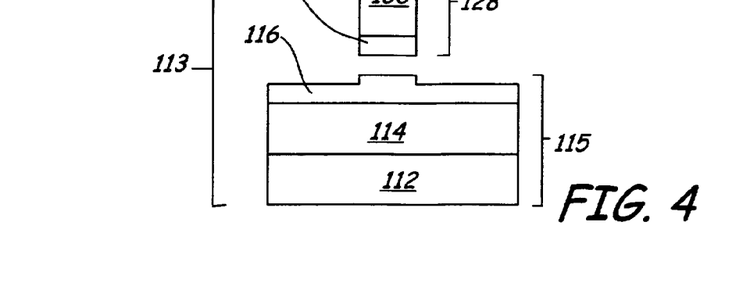
FIG. 4 is a cross-sectional view of a transducing head having a composite core in accord with the present invention, the cross-sectional view being taken along a plane normal to the air bearing surface of the transducing head.
Figure 5:
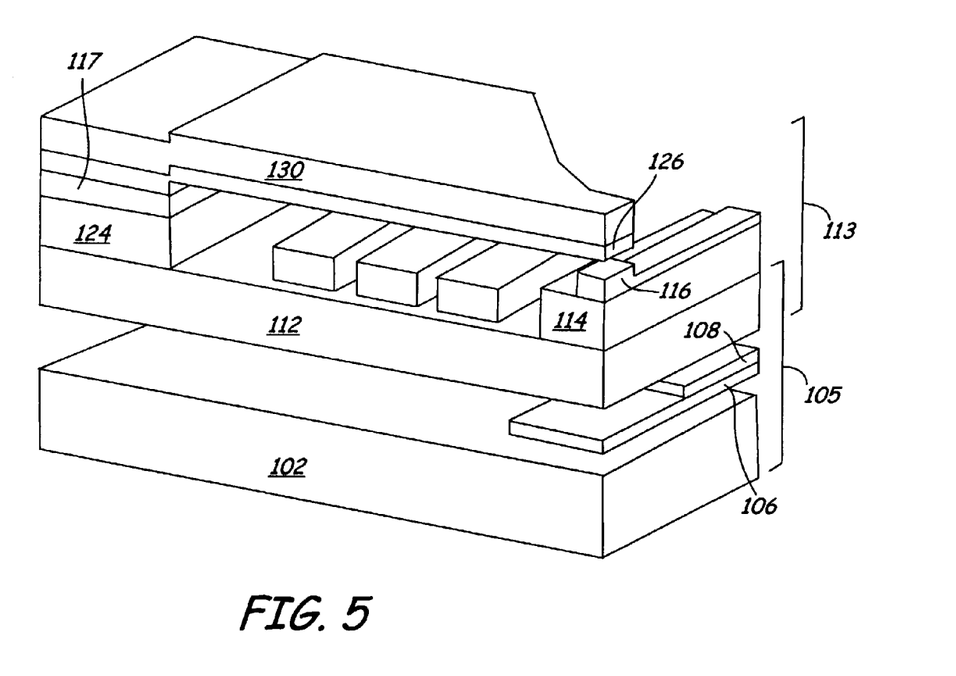
FIG. 5 is a perspective view of transducing head in accord with the present intention.

FIG. 3 is a cross-sectional view of transducing head 100 having composite poles and planar structure in accord with the present invention. The cross-sectional view of FIG. 3 is taken along a plane normal to an air bearing surface ABS of transducing head 100. FIG. 4 is a cross-sectional view taken in the plane of the air bearing surface. For clarity, all spacing and insulating layers are omitted from FIG. 4. FIG. 5 is perspective view of transducing head 100, including writer and reader portions, in which all spacing and insulating layers have been omitted for clarity.

The ABS of transducing head 100 faces disc surface 103 of magnetic disc 101. Magnetic disc 101 travels or rotates in a direction relative to transducing head 100 as indicated by arrow A. Spacing between the ABS of transducing head 100 and disc surface 103 is preferably minimized while avoiding contact between transducing head 100 and magnetic disc 101.

FIG. 3 shows a cross-section of transducing head 100 including a reader portion 105 and a writer portion 113. The reader portion 105 includes bottom shield 102, first half gap 104, read element 106, metal contact layer 108, second half gap 110 and top shield 112. Read element 106 is positioned adjacent the ABS between bottom shield 102 and top shield 112. More specifically, read element 106 is positioned between terminating ends of first half gap 104 and metal contact layer 108. Metal contact layer 108 is positioned between first half gap 104 and second half gap 110. Read element 106 has two passive regions defined as the portions of read element 106 positioned adjacent to metal contacts 108. An active region of read element 106 is defined as the portion of read element 106 located between the two passive regions of read element 106. The active region of read element 106 defines a read sensor width.

Typically, read element 106 is a magnetoresistive (MR) sensor. In operation of transducing head 100, magnetic flux from disc surface 103 of disc 101 causes rotation of the magnetization vector of a sensing layer of MR sensor 106, which in turn causes a change in electrical resistivity of MR sensor 106. Passing a current through MR sensor 106 via metal contact layer 108 and measuring a voltage across MR sensor 106 can detect the change in resistivity within MR sensor 106. External circuitry then converts the voltage information into an appropriate format and manipulates that information as necessary.

The writer portion 113 and reader portion 105 of transducing head 100 are often arranged in a merged configuration, as shown in FIGS. 3 and 5, in which shared pole 112 functions as both a top shield for the reader portion 105 and as a bottom pole for the writer portion 113. The writer and reader portions of transducing head 100 may also be arranged in a piggyback configuration in which the top shield and bottom pole would be two separate layers separated by an insulating layer. Alternatively, the writer portion could be formed without the reader portion.

The writer portion 113 of transducing head 100 includes bottom pole 115, write gap layer 118, insulating layers 119 and 120, conductive coils 122, back via 124, and composite top pole 128. Bottom pole 115 includes shared pole 112, shared pole extension 114, and frosting layer 116. Composite top pole 128 includes top pole seed layer 126 and top pole layer 130. Composite top pole 128 and bottom pole 115 are separated from each other at the ABS of transducing head 100 by write gap layer 118, and are connected to each other at a region away from the ABS by back via 124 and a second portion 117 of the back via. Frosting layer 116, shared pole extension 114, shared pole 112 of bottom pole 115, back via 124, second portion 117, and top pole seed layer 126 and top pole layer 130 of composite top pole 128 form a path for conduction of magnetic flux, collectively called the magnetic core. Electrically conductive coils 122 are held in place between composite top pole 128 and bottom pole 115 by use of write gap layer 118 and insulating layers 119 and 120. Electrically conductive coils 122 are provided to generate magnetic fields across the write gap. Conductive coils 122 are shown in FIGS. 3 and 5 as one layer of coils, but may also be formed of more layers of coils as is known in the field of magnetic read/write head design.

To write data to a magnetic medium, such as magnetic disc 101, a time-varying electrical current, or write current, is caused to flow through conductive coils 122. The write current induces magnetic flux that is conducted within the core and focused at the write gap. The magnetic field bridges the write gap forming a write gap field. The magnetic disc is passed over the ABS of magnetic recording head 100 at a predetermined distance such that the to magnetic surface 103 of disc 101 passes through the gap field. As the write current changes, the write gap field changes in intensity and direction.

Magnetic softness and well-defined magnetic anisotropy of the pole material are important properties for improving writer performance. These properties are in conflict with the desire to include materials with very high magnetic moments in high areal density write heads. Materials with very high magnetic moments are generally hard ferromagnetic materials with the properties of low permeability and high coercivity. However, when composite structures are formed with very high magnetic moment materials in combination with other magnetic materials, the coercivity and permeability of very high magnetic moment materials depend on the properties of the coupled system.

In the present invention, the frosting layer 116 and top pole seed layer 126 are each formed of a material with a very high magnetic moment. The very high magnetic moment material (subsequently referred to as VHMM material) should have a saturation moment of 2.4 T or greater. These materials also have properties of high coercivity and low permeability that were previously considered poor magnetic properties for use in writer pole structures. The VHMM material chosen for the top pole seed layer may be the same material or a different material from that chosen for the frosting layer 116. Suitable materials include FeCo alloys. The atomic percentage of Co in suitable FeCo alloys is approximately in the range of 30 to 50 and preferably in the range of 37 to 50 with about 40 being most preferable. $Fe_{60}Co_{40}$ has a very high saturation moment of approximately 2.45 Tesla (T). By coupling the VHMM material with a magnetically soft film with a lower saturation magnetic moment, for example 1.8 T CoNiFe, the coercivity can be modified downward to 1-3 Oe from 50-80 Oe. Initial permeability of the VHMM layer is affected in a similar way, increasing substantially to about 1400-1600 firom values of 10-100 as an individual layer.

The VHMM material in the frosting layer 116 is coupled to the material used to form the shared pole extension 114. Generally, shared pole extension 114 and back via 124 are formed of a magnetic material, (subsequently referred to as second magnetic material), with a lower saturation magnetic moment relative to the VHMM material. This second magnetic material will have a medium to high saturation magnetic moment compared to magnetic materials generally, with values generally in the range of 1.6-2.2 T. The second material will also generally have a higher resistivity, higher permeability and lower coercivity than the VHMM material. $Ni_{78}Fe_{22}$, $Ni_{45}Fe_{55}$, and $Co_{65}Ni_{20}Fe_{15}$ are examples of suitable materials for the shared pole extension and back via.

The top pole seed layer 126 is likewise coupled to the material(s) used to form the top pole layer 130. Similarly, the shared pole 112 is coupled to the shared pole extension 114 and back via 124. Top pole layer 130 and shared pole 112 are each formed of a layer of soft magnetic material or several layers of soft magnetic materials separated by layers of nonmagnetic materials. The top pole layer 130 may be formed of the same or different materials and/or layer configurations from the shared pole 112. The saturation magnetic moment of the top pole layer 130 and the saturation magnetic moment of the shared pole 112 are relatively lower than the saturation magnetic moment of the top pole seed layer 126 and frosting layer 116. An example material suitable for shared pole 112 and top pole 130 is Permalloy ($Ni_{78}Fe_{22}$ and other similar compositions).

Figure 6:
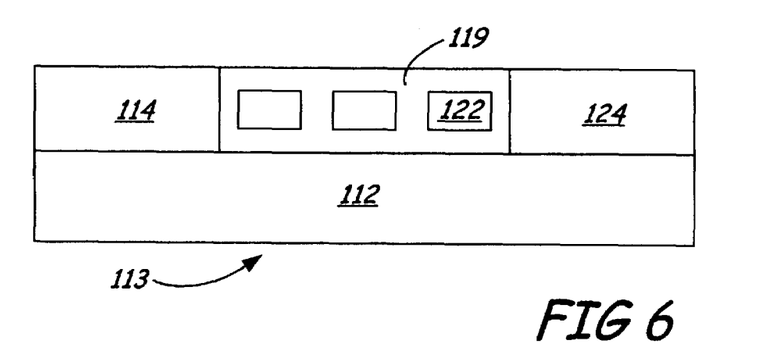
FIGS. 6-17 are cross-sectional views illustrating a method of forming the writer portion of a transducing head of the present invention.

The writer portion 113 of the present invention can be built using several conventional processing steps. FIGS. 6-17 are cross-sectional views taken normal to the ABS, illustrating a method of forming the writer portion 113 of transducing head 100. FIGS. 18-19 are cross-sectional views from the ABS further illustrating the method of formation. The method is described according to the following steps:

FIG. 6 shows a partially formed writer portion 113. The planarized structure shown in FIG. 6 includes the shared pole 112, the shared pole extension 114, the back via 124, the writer coil 122, and the writer coil insulator 119. The structure of FIG. 6 may be formed using known methods of masking and electroplating. Subsequent deposition of insulator 119 with optional chemical-mechanical polishing results in the planar structure as shown in FIG. 6. The conductive coils are typically composed of electrically conductive but nonmagnetic materials such as copper or gold. Insulator 119 must be electrically nonconductive to prevent shorting of the coils.

Figure 7:
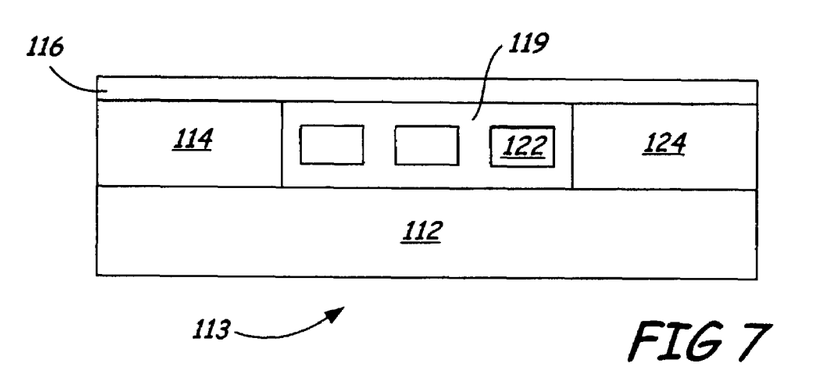
Figure 8:
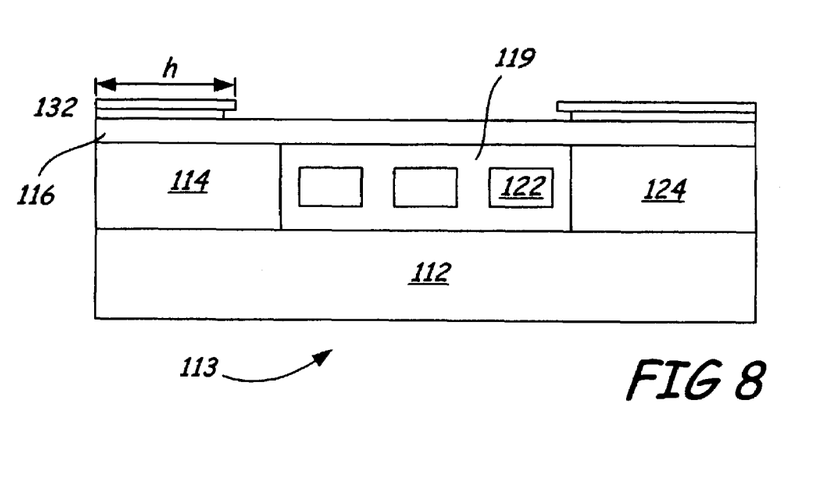
Figure 9:
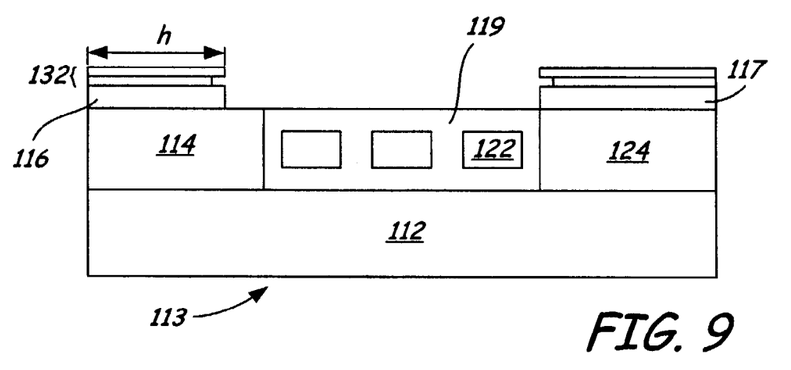

VHMM material for frosting layer 116 is deposited onto the planar structure of FIG. 6 to produce the structure shown in FIG. 7. Next, liftoff patterning is performed. An example of this process would be the deposition of a bi-layer photoresist 132, for example PMGI-Novolac onto the VHMM layer 116, followed by exposure and development to achieve the pattern shown in FIG. 8. A subtractive process is applied, for example ion milling to remove a portion the VHMM layer and thereby expose the insulator 119 around electrical coils 122. Through action of the subtractive process, the VHMM layer becomes two separate areas, the frosting layer 116 adjacent to the ABS and a second portion 117 which functions with the back via 124. The lift-off patterning displayed in FIGS. 8 and 9 controls the throat height, h, of the writer portion 113 by dimensional control during formation of the frosting layer 116.

Figure 10:
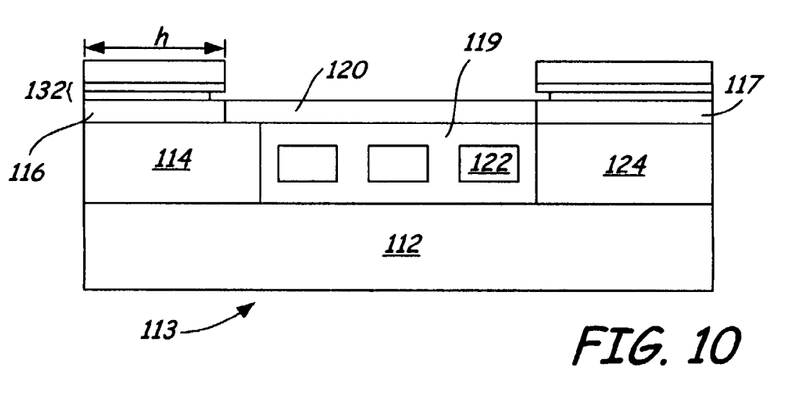

Another layer 120 of insulating material is applied over the remaining photoresist and the exposed insulator 119 as shown in FIG. 10. The insulator 120 may be a different material or the same material as used for insulator 119. The thickness of the insulating layer 120 should be equal to the thickness of the frosting layer 116.

Figure 11:
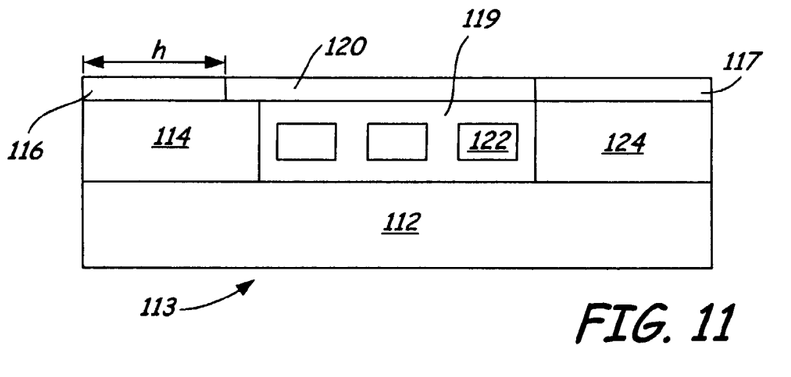
Figure 12:
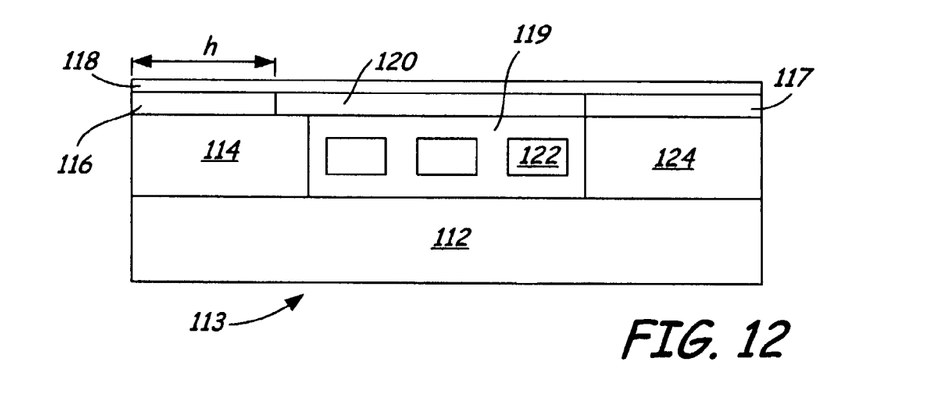

In FIG. 11, the partially formed writer portion 113 is shown following the removal of the resist 132 together with any insulator layer 120 deposited upon the resist 132. Removal of the resist 132 and portions of insulator layer 120 results in a planar structure. In the following step shown in FIG. 12, a layer of insulator corresponding to the writer gap layer 118 is deposited across the structure. This layer of material may be electrically conductive but should be magnetically inactive. Suitable examples include alumina and copper.

Figure 13:
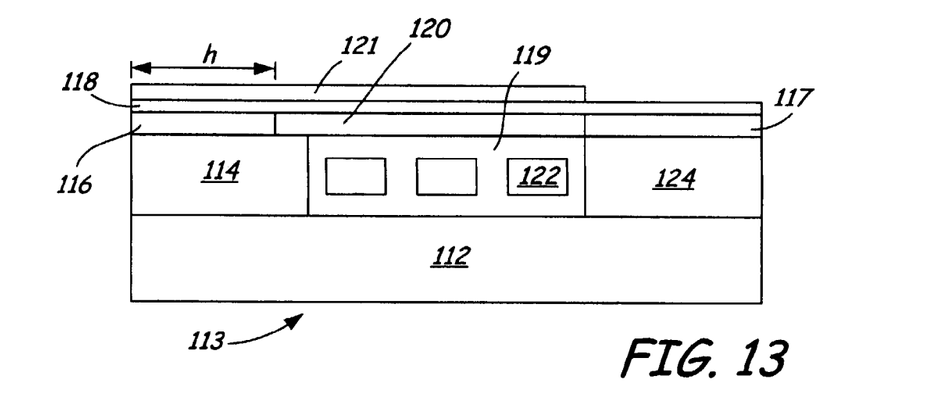
Figure 14:
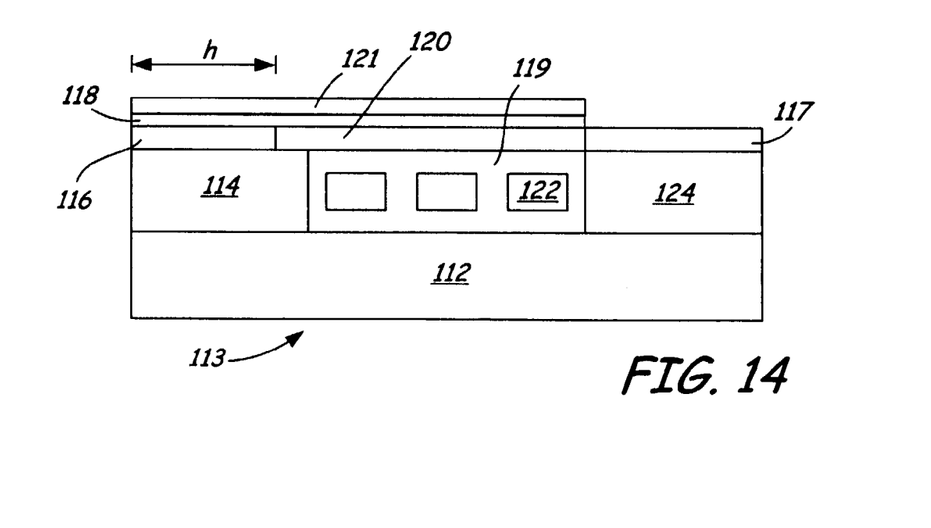
Figure 15:
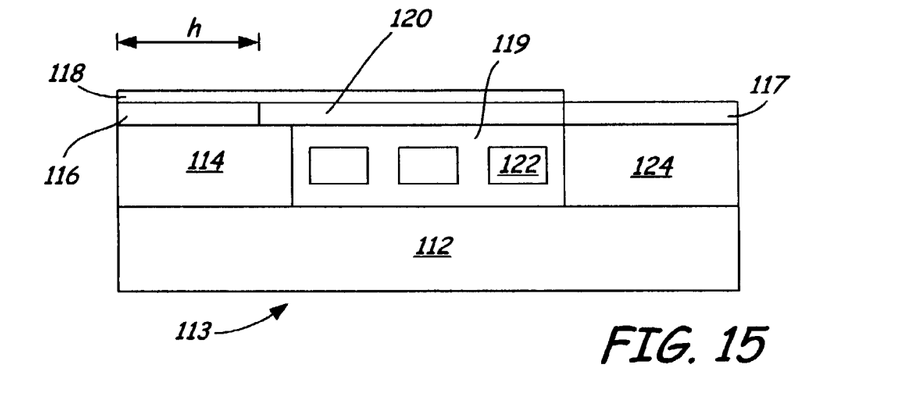

In FIG. 13, the writer gap layer 118 is patterned by a subtractive process wherein a protective layer of resist 121 is applied across the structure and subsequently exposed and developed to remove that portion of the writer gap layer 118 over the back via 124 using etching or milling before removing the photoresist. Subtractive processing is performed thereby removing the excess material. The resulting structure is shown in FIG. 14 where the VHMM over the region of the back via 124 is exposed. Subsequently the resist material 121 is removed leaving the structure as shown in FIG. 15.

Figure 16:
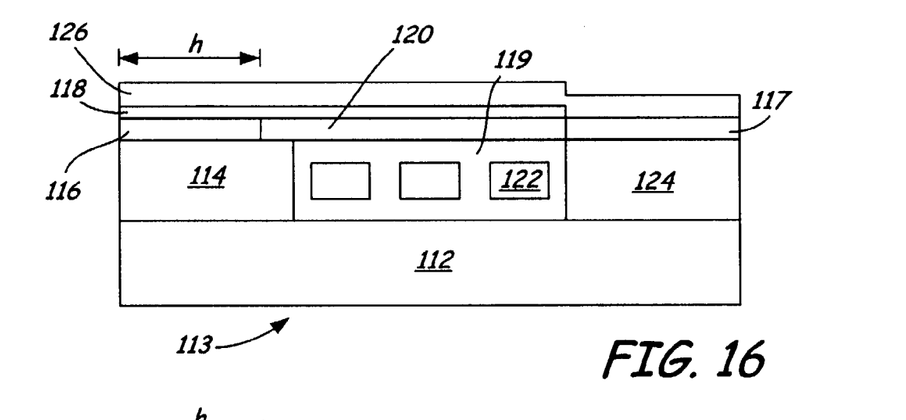

Next, the VHMM material forming the top pole seed layer 126 is deposited across the structure resulting as shown in FIG. 16. The top pole seed layer 126 contacts the VHMM material previously deposited onto the back via 124 thereby connecting the magnetic core. The top pole seed layer 126 is substantially planar thereby assisting accurate masking for deposition of the top pole layer 130. A photolithography process is used to create a mask defining the notch width. The top pole layer 130 is subsequently plated through the opening in the mask, followed by removal of the resist, resulting in the structure as shown in FIG. 17.

Figure 17:
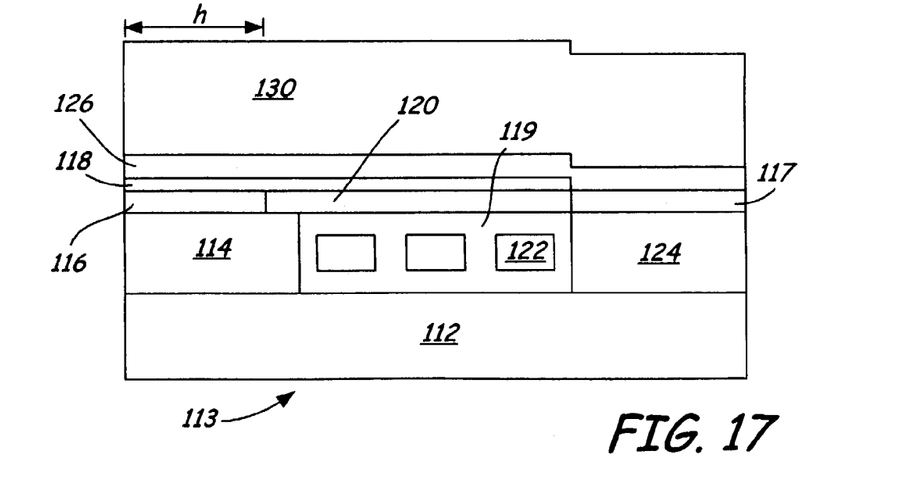
Figure 18:
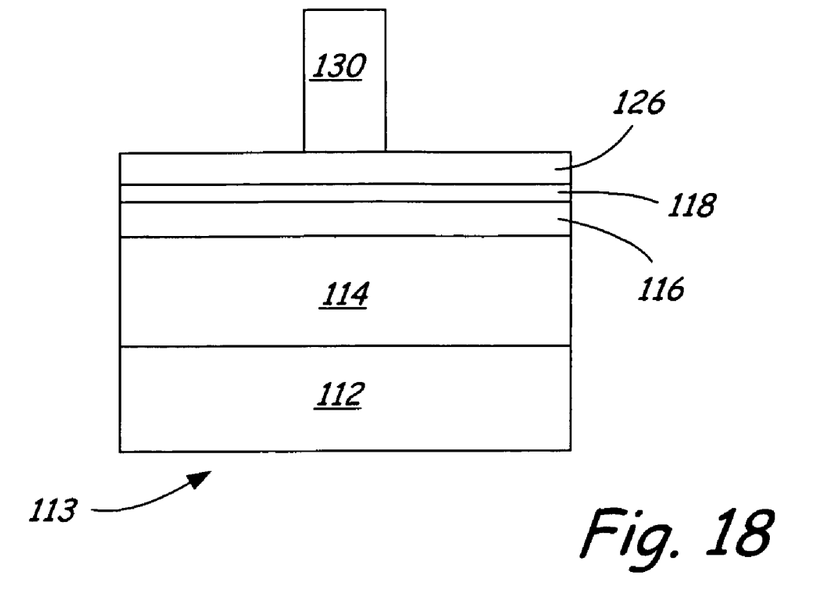
FIGS. 18-19 are cross-sectional views of the writer portion of a transducing head in accord with the present invention, the cross-sectional views being taken along a plane parallel to the air bearing surface of the transducing head, showing definition of the top pole.
Figure 19:
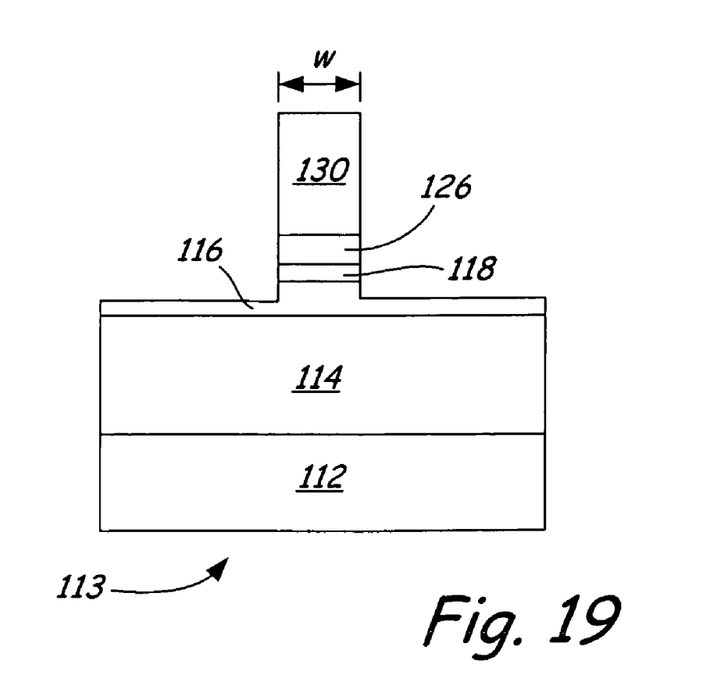

The same structure of FIG. 17 is shown as viewed from the ABS in FIG. 18. Subsequently, the notch milling is performed into the top pole seed layer 126, the write gap layer 118 and into the frosting layer 116. It is desired that the milling stop within the frosting layer 116 resulting in the structure of FIG. 19. The planarity of the top pole layer 130 assists in accurate milling of the notch width, w, of the writer shown in FIG. 19.

The composite core writer of transducing head 100 offers significant improvements in writer efficiency over the prior art writers. The substantially planar design of the writer portion 113 is readily manufactured by current techniques. Additionally, the planar shape of composite top pole 128 allows for a reduction in core height and length, thereby increasing the efficiency of the writer due to a shortened flux path. Another advantage of planarity of composite top pole 128 is greater control over the notch width of the pole tip at the ABS, thereby allowing for greater control of a track width of the data written to the magnetic media.

Another advantage of the present design is the separation of throat height dimensional control from the dimensional control of composite top pole 128 and shared pole extension 114. The size and shape of the frosting layer 116 below the writer gap, positioned on top of the shared pole extension, defines the magnetic throat height. When the frosting layer 116 is deposited in the form of a sheet film, then liftoff patterning is used to define the throat height, followed with planarization of the throat height edge using a deposition of a nonmagnetic material. A very short throat height decreases the gap area and effectively increases the fringe field allowing the writer to activate higher coercivity media for high linear density recording. However, control of the throat height is important for magnetic field control because excessively short throat height can cause excessive magnetic flux density in the gap and create fringe field distortion.

Additionally, separate definition of the frosting layer 116 from the shared pole 112 and shared pole extension 114 allows the portions to have different cross-sectional areas (volumes). Magnetic materials with lower saturation moments require a larger volume (cross-sectional area) of material to conduct the same amount of flux as a smaller volume of higher moment material. Therefore, separate definition of the bottom pole structures allows for effective channeling of magnetic flux to the frosting layer 116 by individually controlling the cross-sectional area (volume) of each structure in relation to the flux density capacity of the material used for that structure. This avoids problems such as excessive flux density leakage and other inefficiencies in the transmission of magnetic flux.

In summary, the transducing head of the present invention incorporates the use of VHMM materials on both sides of the writer gap in a composite magnetic core formed of a high magnetic moment material with one or more lower magnetic moment material to achieve a higher magnetic saturation than is possible with the softer materials alone and a higher permeability than is possible with the VHMM material alone. The inventive structure and use of VHMM materials increases the write gap field strength of the transducing head with a high field gradient for writing of sharp media transitions with minimum cross-track curvature. This leads to increased overwrite (OVW) on high-coercivity media and a narrower pulse width of the detected signal. Thus the transducing head of the present invention will have an increased potential areal density and improved potential frequency response over prior art transducing heads.

Although the present invention has been described with reference to preferred embodiments, workers skilled in the art will recognize that changes may be made in form and detail without departing from the spirit and scope of the invention.

The invention claimed is:

1. A magnetic head comprising:
   a non-magnetic write gap layer; and
   a pair of magnetic poles separated by the write gap layer, wherein each magnetic pole has a layer of very high magnetic moment material adjacent to the write gap layer, and wherein one of the pair of magnetic poles comprises:
   a pole layer formed from a first magnetic material;
   a pole extension formed on the pole layer and formed from a second magnetic material; and
   a first very high magnetic moment layer upon the pole extension, wherein the first very high magnetic moment layer comprises a substantially planar surface having a protrusion extending to the write gap layer with a profile defining a magnetic throat height.

2. The magnetic head of claim 1 wherein the very high magnetic moment material adjacent to the write gap layer is a CoFe alloy.

3. The magnetic head of claim 2 wherein the CoFe alloy contains between about 30% to about 50% Co.

4. The magnetic head of claim 3 wherein the CoFe alloy contains between about 37% to about 50% Co.

5. The magnetic head of claim 4 wherein the CoFe alloy contains about 40% Co.

6. The magnetic head of claim 1 wherein the second magnetic material comprises a NiFe alloy or a CoNiFe alloy having a saturation magnetic moment from between about 1.6 to about 2.2 T.

7. The magnetic head of claim 6 wherein the second magnetic material has the characteristic of lower coercivity relative to the very high magnetic moment material.

8. The magnetic head of claim 7 wherein the second magnetic material has a coercivity less than 100 Oe, permeability greater than 1000 at 10 MHz, and well-defined anisotropy.

9. A magnetic head comprising:
   a non-magnetic write gap layer; and
   a pair of magnetic poles separated by the write gap layer, wherein each magnetic pole has a layer of very high magnetic moment material adjacent to the write gap layer, and wherein one of the pair of magnetic poles comprises:
   a magnetic shared pole;
   a magnetic shared pole extension positioned on the shared pole adjacent to an external surface; and
   a frosting layer of very high magnetic moment material positioned on the shared pole extension adjacent the write gap layer, wherein the frosting layer has a protrusion extending to the write gap layer, and
   wherein the other of the pair of magnetic poles comprises a substantially planar composite top pole formed of a top pole seed layer of very high magnetic moment material and a magnetic top pole layer, wherein the top pole seed layer is separated from the frosting layer by the write gap layer.

10. The magnetic head of claim 9 and further comprising:
    a magnetic back via connecting the composite top pole to the shared pole opposite the external surface; and
    a conductive coil positioned such that at least a portion of the conductive coil is positioned between the shared pole and the top pole.

11. The magnetic head of claim 9 wherein the top pole seed layer and the frosting layer are each formed from a CoFe alloy material with a saturation moment of 2.4 T or higher.

12. The magnetic head of claim 10 wherein the magnetic shared pole extension and the magnetic back via are formed from a soft magnetic material.

13. The magnetic head of claim 9 and further comprising:
    a bottom shield; and
    a read element positioned between the bottom shield and the shared pole.

14. A magnetic head comprising:
    a non-magnetic write gap layer; and
    a pair of magnetic poles including a bottom pole and a top pole separated by the write gap layer, wherein each magnetic pole has a layer of very high magnetic moment material adjacent to the write gap layer, and wherein the bottom pole comprises:
    a bottom pole layer formed from a first magnetic material;

a bottom pole extension formed on the bottom pole layer and formed from a second magnetic material; and a first very high magnetic moment layer formed from a third magnetic material upon the bottom pole extension, wherein the first very high magnetic moment layer has a profile defining a magnetic throat height and the third magnetic material comprises a CoFe alloy, wherein the first very high magnetic moment layer has a protrusion extending to the write gap layer; and wherein the top pole comprises:

a first magnetic layer formed from a fourth magnetic material; and a second very high magnetic moment layer formed from a fifth magnetic material, wherein the second very high magnetic moment layer defines a write gap with the first very high magnetic moment layer, and wherein the fifth magnetic material comprises a CoFe alloy.

15. The magnetic head of claim 14 and further comprising:

a conductive coil which lies between the bottom pole and the top pole.

16. The magnetic head of claim 14 and further comprising:

a back gap closure connecting the bottom pole and the top pole.

17. The magnetic head of claim 14 wherein the second magnetic material comprises a NiFe alloy or a CoNiFe alloy having a saturation magnetic moment from between about 1.6 to about 2.2 T.

18. The magnetic head of claim 14 wherein the first magnetic material and the fourth magnetic material are magnetically soft materials.

19. The magnetic head of claim 14 wherein the top pole is substantially planar.

* * * * *